United States Patent

[11] 3,618,862

| [72] | Inventors | Morton E. Phelps<br>9417 New Benton Highway, Little Rock, Ark.; Tommy O. Bell, Hallsville, Tex. 75650 |
|---|---|---|
| [21] | Appl. No. | 878,759 |
| [22] | Filed | Nov. 21, 1969 |
| [45] | Patented | Nov. 9, 1971 |

[54] APPARATUS FOR CONTROLLING THE DISPERSION OF LIQUID IN AN AIR NOZZLE
2 Claims, 4 Drawing Figs.

[52] U.S. Cl. ................................. 239/341, 239/347
[51] Int. Cl. ..................................... B05b 7/30
[50] Field of Search ............................ 239/8, 11, 341, 346, 347, 348, 369, 409, 434

[56] References Cited
UNITED STATES PATENTS

| 817,819 | 4/1906 | Walkup | 239/341 |
| 1,805,632 | 5/1931 | Miler | 239/8 |
| 2,003,087 | 5/1935 | Lynger | 239/347 |
| 3,421,695 | 1/1969 | Phelps et al. | 239/164 |

FOREIGN PATENTS

| 1,048,168 | 11/1966 | England | 239/346 |

Primary Examiner—Lloyd L. King
Assistant Examiner—Reinhold W. Thieme
Attorney—Berman, Davidson & Berman ABSTRACT: A liquid supply tank carrying a solution of insecticide, herbicide, fertilizer, etc., feeds, by gravity, to a constant level float control chamber. A pipe connects the interior of the float chamber above its liquid level to a source which, optionally, may provide absolute pressure above or below atmospheric. The float chamber, below its liquid level, is connected to the suction side of an eductor type of nozzle operated by air at constant pressure for any particular distribution. The supply of liquid permitted to be drawn by eductor action and distributed by the nozzle is regulated by regulating the head, positive or negative, in the space above the liquid level in the supply chamber.

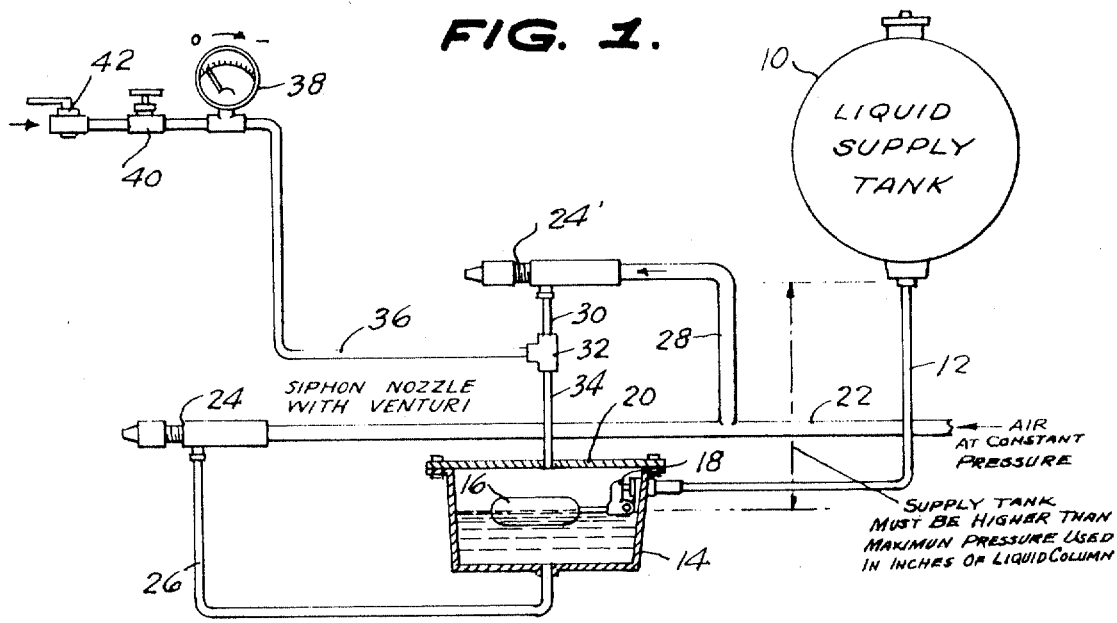
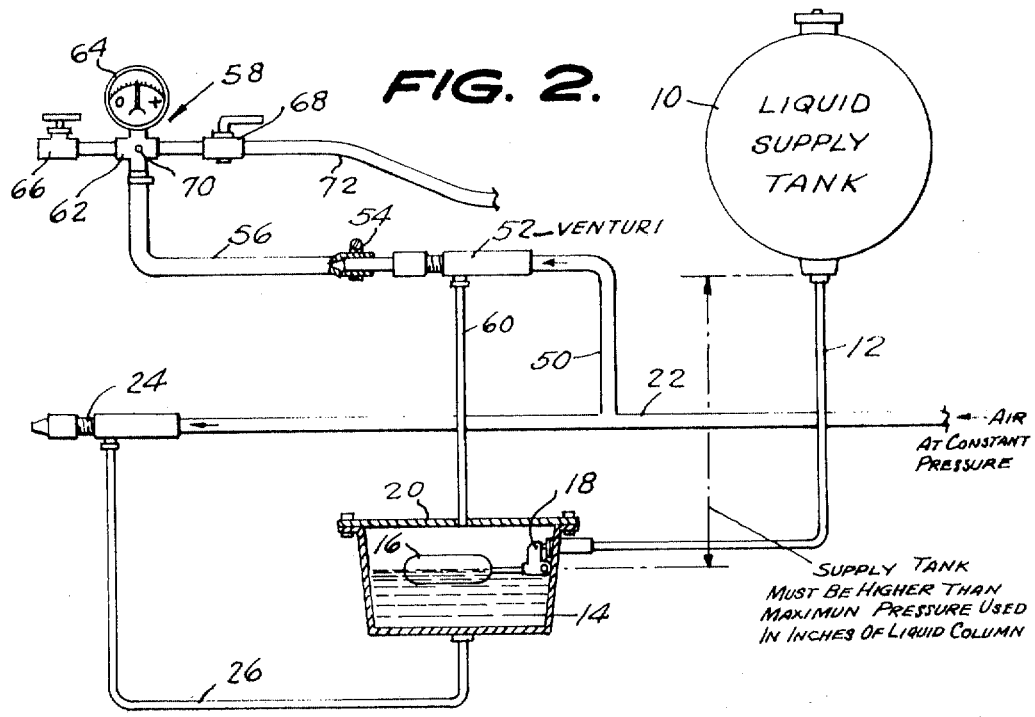

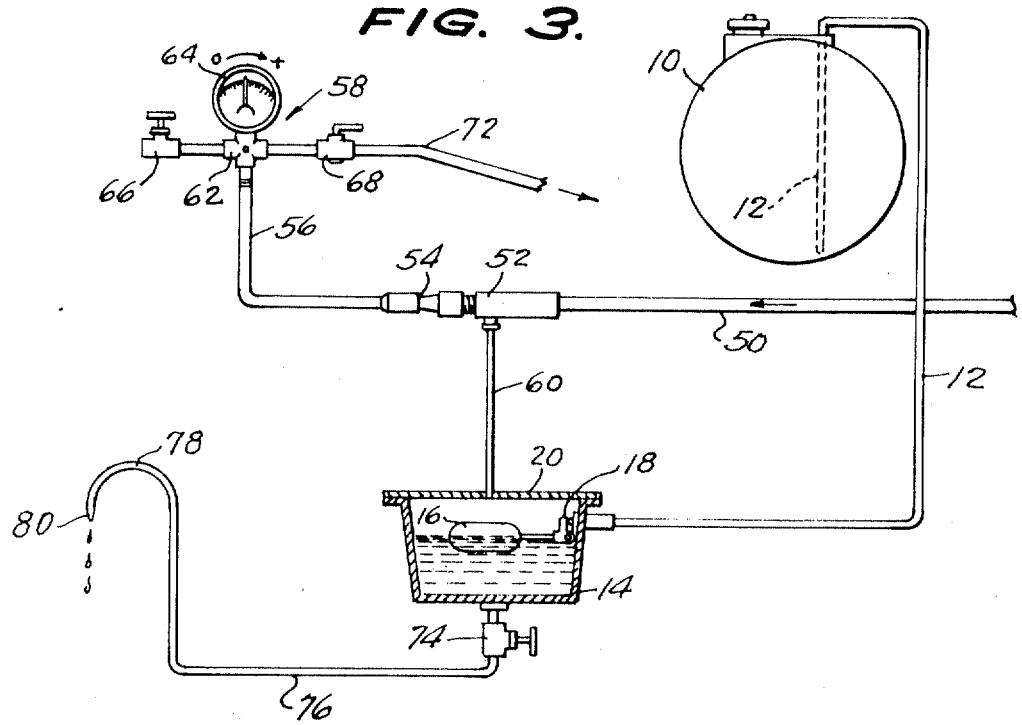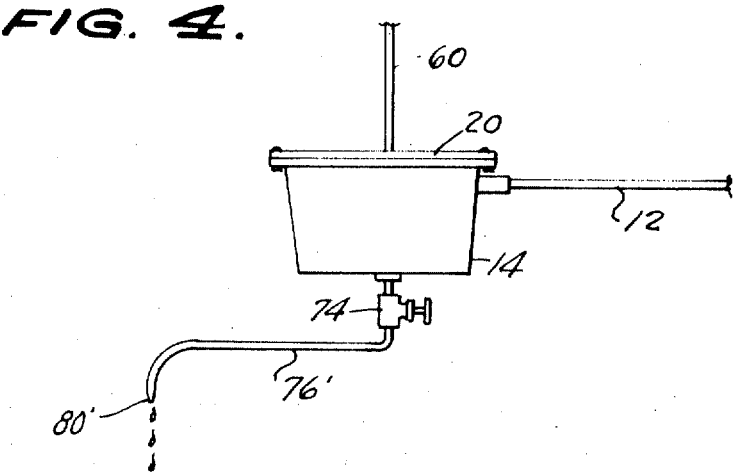

3,618,862

APPARATUS FOR CONTROLLING THE DISPERSION OF LIQUID IN AN AIR NOZZLE

In our previous U.S. Pat. No. 3,421,695, dated Jan. 14, 1969, entitled "APPARATUS FOR SPRAYING MINUTE QUANTITIES OF LIQUID DISPERSED IN AIR" there was disclosed a spray apparatus utilizing siphon-type nozzle in which compressed air at constant pressure, passing through the nozzle, created vacuum in a duct which drew liquid from the bottom of the float chamber. By regulating either the air pressure in the line or the vertical elevation between the nozzle and the level of the liquid in the float chamber, the quantity of liquid delivered to the nozzle could be varied and reduced to very small amounts where the liquid contains powerful or dangerous ingredients.

It is an object of the present invention to improve the liquid feeding control in a spray system, such as just mentioned, which will provide for feeding only minute proportions of liquid to the air flowing through the nozzle or, with the same installation, permitting very heavy delivery of liquid into the flowing air column. This wide range is necessary if the same apparatus is to serve, on the one hand for uniform distribution of minute quantities of hazardous pesticides and, on the other hand, for large quantities of slurries or solutions of such innocuous formulations as typical fertilizers.

The above and other objects will be made clear from the following detailed description taken in connection with the annexed drawings, in which:

FIG. 1 is a more or less schematic view showing one the simplest possible arrangements of the present invention;

FIG. 2 is a refined and more versatile version of FIG. 1;

FIG. 3 shows a further and specialized refinement of arrangement of FIG. 2; and

FIG. 4 is a further variation on FIG. 3.

Referring now to FIG. 1, there is shown a liquid supply tank 10 which is filled with a solution or slurry of an insecticide, a herbicide, a fertilizer or any other desired chemical. A line 12 connects the liquid supply tank 10 to a float valve chamber 14 containing a conventional float 16, operating a shutoff valve 18. This arrangement has the familiar action of maintaining a constant level of fluid within the chamber 14.

The chamber 14 has a lid 20 hermetically gasketed to the rim of the chamber 14 forming a sealed air chamber above the liquid level in the chamber 14.

An air line 22 connects to a conventional siphon-type nozzle 24. The line 22 is connected to a source of constant pressure air, the pressure being adjustable but usually remaining constant for any particular operation while a siphon line 26 connects the nozzle 24 to the bottom of the float chamber 14.

The foregoing is substantially the arrangement shown in our aforementioned U.S. Pat. 3,421,695 except that in that patent the lid 20 is penetrated by a venting line open to the atmosphere. Air passing through the line 22 is accelerated by a venturi in the nozzle 24, thus creating a vacuum which, through the line 26 withdraws liquid from the float tank 14 and the liquid, comingling with the airstream of the nozzle 24, emerges as a fine spray. The conventional nozzle 24 including a venturi may take the exact structure shown and described in our U.S. Pat. No. 3,512,719. This applies also to the conventional venturi 52, later described, which need merely omit the nozzle parts utilized for forming the spray.

In the present arrangement, a bypass line 28 is connected to the air line 22 and supplies a nozzle 24' which, as a matter of convenience, is identical with the nozzle 24. The nozzle 24' has a vacuum or siphon connection 30 which enters a Tee 32 and then proceeds to penetrate the lid 20 of the chamber 14.

A branch line 36 runs from the Tee 32 to a vacuum gauge 38, thence to a regulator valve 40, 40, and thence to an on-off valve 42, which has one end open to the atmosphere.

If the valve 42 is closed, then the line 32–34 would draw precisely the same vacuum as the line 26 so that the lines 30–34 would completely overcome the line 26 and no liquid would be delivered from the tank 14 to the nozzle 24.

If both the valves 42 and 40 are opened, there would be no vacuum developed above the liquid level of the tank 14 and the nozzle 24 would be left to function on its own, as in our patent aforesaid. If, however, with valve 42 open, the valve 40 is partially closed, the vacuum in the line 30 will be only partially effective above the liquid level in the tank 14 and to that extent will oppose the vacuum drawn by the nozzle 24 on the line 26, thus reducing the delivery of liquid to the nozzle 24 while the airflow through that nozzle will remain constant. There is thus provided a very accurate means of control in the lower ranges for delivery of liquid to the nozzle 24. The vacuum gauge 38 can easily be calibrated to indicate directly the quantity of liquid permitted to flow through the line 26 to the nozzle 24.

In FIG. 2, supply tank 10, line 12, float chamber 14, float 16, valve 18, lid 20, air line 22, nozzle 24, and vacuum line 26 are all identical with equivalent parts shown in FIG. 1. The air line 22, however, has a branch 50 connected with a venturi 52 which, instead of a nozzle spray tip, is connected at 54 to a line 56 running to a control device generally designated 58. From the venturi 52, a vacuum-pressure line 60 goes to penetrate the lid 20 and communicate with the space above the liquid level in the tank 14.

The nozzle 24 and the venturi 52 are calculated so that on open line conditions the vacuum in the line 60 will equal vacuum in the line 26, under which circumstances no liquid is delivered to the nozzle 24.

The control device 58 comprises a crossjoint 62 having one of its branches connected to the line 56 with the opposite branch connected to a gauge 64 of a type to register either vacuum or superatmospheric pressure.

One of the crossbranches is connected to a control valve 66 and the other to an on-off valve 68. At the center of the crossjoint 62 there is formed a vent or orifice 70 which will prevent a positive pressure being created which is greater than the gravity head between the supply tank and the float chamber. If the on-off valve 68 is open, the effect will be the same as in FIG. 1 with the vacuum in line 60 balancing the vacuum in the line 26 so that no liquid will be delivered to the nozzle 24. This provides for instant cutoff of liquid from the nozzle 24. With the on-off valve 68 closed, flow will go from the line 56 through the regulator valve 66. The initial partial closure of the valve 66 will reduce vacuum in the line 60, thereby increasing the net effective vacuum in the line 26 and still further closure of the regulator valve 66 will so far restrict airflow through the venturi 52 that there will be a positive superatmospheric pressure in the line 60 and accordingly a considerable delivery of liquid through the line 26 to the nozzle 24.

Since both valves 66 and 68 necessarily are in close proximity to the operator, there arises a certain danger that with the valve 68 wide open and with maximum vacuum therefore in the line 60, a surge or turbulence in the float chamber 14, occasioned by roughness of terrain over which the apparatus passes, might bring a surge of liquid through the tube 60 and through the valve 68. This, in the case of highly hazardous chemicals, is intolerable in such proximity to the operator, for which reason, with the arrangement of FIG. 2 and as a safety factor, a discharge pipe 72 is provided, connected to the on-off valve 68 to take care of such contingencies.

For crop spraying, particularly from fixed wing airplanes or helicopters, where the vehicle speed ranges between 60 and 150 miles per hour, a spinner type of nozzle, developed by the U.S.D.A., has obtained widespread acceptance. This nozzle, however, requires a small positive head on the liquid, The arrangement of FIGS. 3 and 4 shows an adaptation of FIG. 2 to supply liquid to such nozzles. So far as applicable, reference numerals used in FIG. 2 are also used in FIG. 3.

Referring now to FIG. 3, it will be seen that the line 12, which connects the supply tank 10 to the float chamber 14, extends to a point above the supply tank and has an extension 12′ going to approximately the bottom of the tank 10 so as to constitute a siphon.

In use, the control unit 58 is operated so as to draw a vacuum on the line 60 sufficient to fill the line 12–12' and start a siphon action to feed liquid from the supply tank 10 to the float chamber 14. Thereafter, the control valve 66 may be set so as merely to maintain approximately atmospheric pressure in the line 60. When the float chamber 14 is filled, the control valve 66 may be operated to give a slight superatmospheric pressure in the line 60. This will drive liquid from the float chamber 14 through a cutoff valve 74 into a line 76 which has an upper loop 78 above the liquid level in the chamber 14, thus establishing a siphon effect between the chamber 14 and the delivery point 80 of the line 76. The delivery point may be, of course, any type of nozzle, especially of the type which cannot be relied on to develop its own suction.

FIG. 4 represents simply a variation on FIG. 3, in which the cutoff valve 74 delivers to a line 76' which, without any siphon effect, goes to a delivery point 80' below the liquid level in the chamber 14.

In the case of either FIGS. 3 or 4, a positive, superatmospheric pressure may be maintained in the line 60 to assure heavy delivery of liquid from the chamber 14. In this case, it may be desirable to provide a controlled connection between the line 60 and the top of the supply tank 10 to assure heavy delivery of liquid from the chamber 14. In this case, it may be desirable to provide a controlled connection between the line 60 and the top of the supply tank 10 to assure uninterrupted delivery to the chamber 14, and to minimize the required difference in liquid levels between the tank 10 and the chamber 14.

It will be seen from the foregoing that we have devised a control system combining maximum safety to the operator with an extremely wide and versatile range of delivery to the spray nozzles. No doubt, numerous variations of detail will occur to anyone skilled in the art who peruses this specification It is not intended, therefore, to limit the invention to the precise details herein disclosed.

What is claimed is:

1. A spray device comprising: a spray nozzle; a compressed air line connected to said nozzle; a first venturi formed in said nozzle; a constant level liquid chamber; a tube connecting said venturi with said chamber below the liquid level therein; a second tube connected to said constant level chamber above the liquid level therein, a second venturi connected to said second tube, and means connected to said second tube and second venturi for adjusting the absolute pressure within said second tube from an absolute pressure sufficient to nullify the pressure in said first venturi to at least atmospheric pressure, whereby to regulate the flow of liquid from said chamber to said first venturi.

2. A spray device according to claim 1, wherein said means for adjusting the absolute pressure within said second tube is effective for controlling the pressure between an absolute pressure sufficient to nullify the pressure in said first venturi to a pressure above atmospheric pressure.

* * * * *